Feb. 11, 1958 R. M. PAGE 2,823,351
VOLTAGE RATIO INDICATOR
Filed Nov. 14, 1945 2 Sheets-Sheet 1
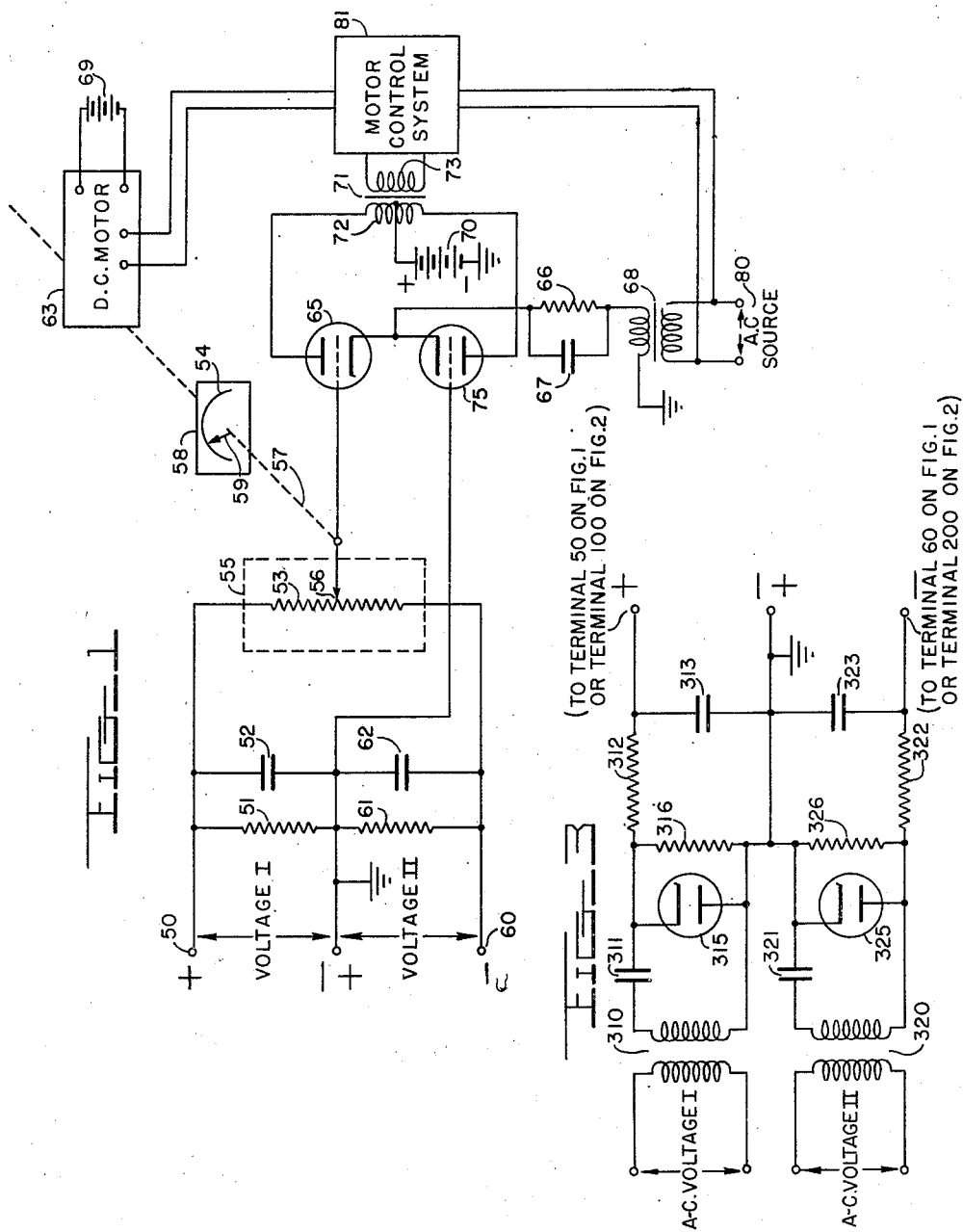
Inventor
ROBERT M. PAGE
By Robert L. Chappell
Attorney

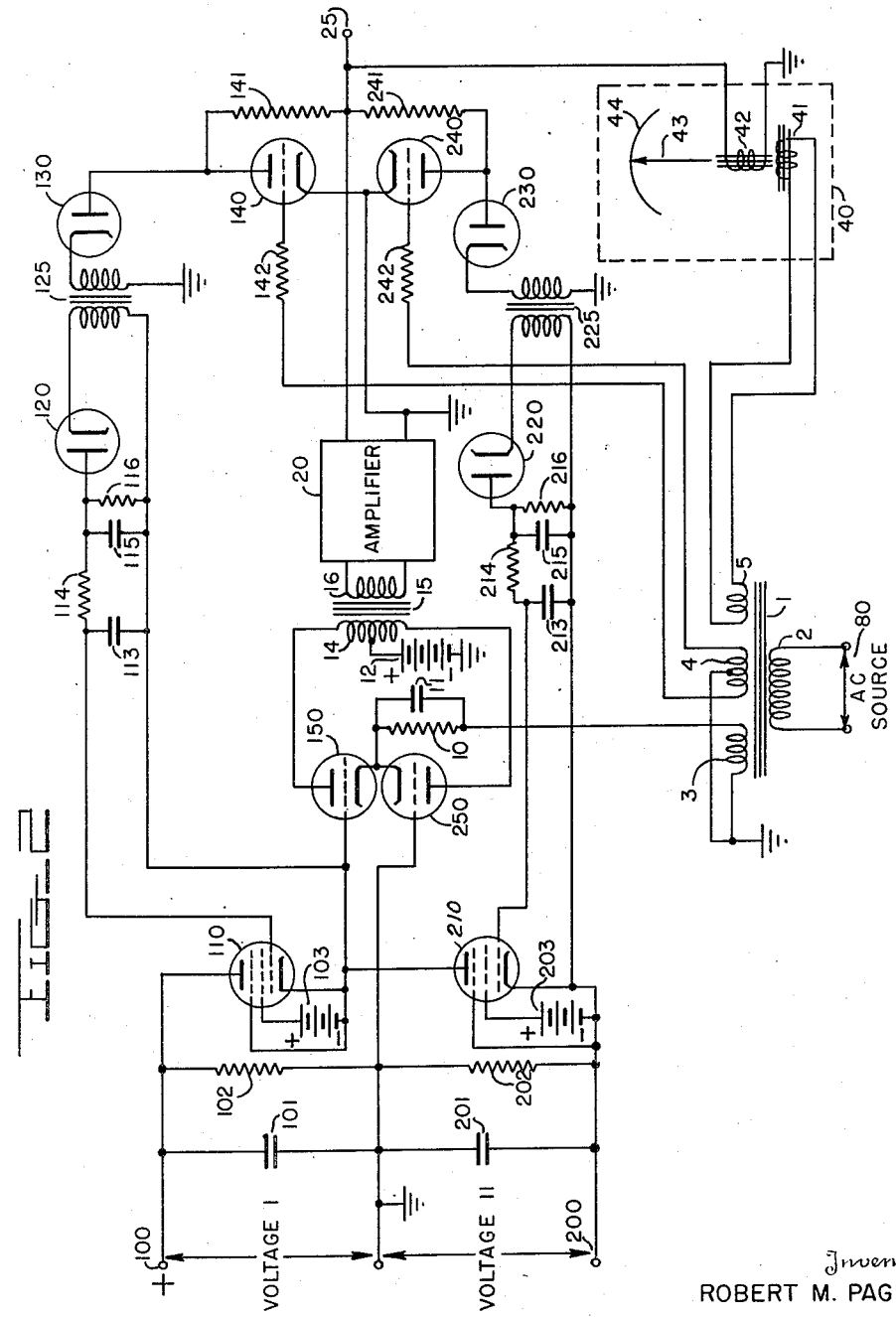

United States Patent Office

2,823,351
Patented Feb. 11, 1958

2,823,351

VOLTAGE RATIO INDICATOR

Robert M. Page, Washington, D. C.

Application November 14, 1945, Serial No. 628,623

13 Claims. (Cl. 324—99)

(Granted under Title 35, U. S. Code (1952), sec. 266)

This invention relates to electrical indicators and in particular to apparatus for evaluating and indicating automatically the ratio of two voltages.

In numerous important applications, automatic evaluation of the ratio of two variables is highly desirable; it can be employed to eliminate intermediate manual operations in many electronic techniques. Accordingly, an object of this invention is to provide a means by which the ratio of two voltages, or the ratio of two variables susceptible of representation as voltages, may be rapidly and automatically evaluated.

Another object of this invention is to provide apparatus which will automatically and continuously indicate the ratio of two voltages.

Two embodiments of the invention are herein disclosed. In one embodiment the voltage ratio is indicated mechanically by the angular position of a rotatable shaft; the other embodiment is wholly electronic, providing an output voltage which is proportional to the ratio of the voltages being compared.

The invention will be described with reference to the appended drawings in which:

Figure 1 shows in schematic and block form an embodiment of the invention that indicates, by the position of a shaft, the ratio of two D.-C. voltages;

Figure 2 shows in schematic and block form a wholly electronic embodiment of the invention, also designed for comparison of D.-C. voltages; and Figure 3 is a schematic diagram showing a modification applicable to either embodiment of the invention to adapt it for the comparison of A.-C. voltages.

Referring to Figure 1, the D.-C. voltages to be compared are thereon denoted "Voltage I" and "Voltage II." These two voltages are so connected as to have opposite polarity relative to ground; that is, the negative side of the source providing voltage I is grounded while the positive side of the source providing voltage II is grounded. The positive side of voltage I is applied to terminal 50; the negative side of voltage II is applied to terminal 60.

Resistor 51 and condenser 52 are connected in parallel between terminal 50 and ground. Resistor 61 and condenser 62, identical respectively to resistor 51 and condenser 52, are connected between terminal 60 and ground.

A potentiometer 55 is provided which may be of a conventional type having a fixed resistance element and a sliding contact affixed to a rotatable shaft. The sliding contact can be set at any point on the resistance element from one end terminal to the other by appropriate rotation of the shaft. In Figure 1, the potentiometer 55 is represented schematically, the resistance element thereof being designated 53, the sliding contact being 56, and the rotatable shaft being designated 57. Resistance element 53 is bridged between terminals 50 and 60. Sliding contact 56 is connected electrically to the grid of tube 65. Shaft 57 is coupled mechanically to the shaft of D.-C. motor 63 and to the moving component 59 of ratio indicator 58. Ratio indicator 58 is a device for showing the angular position of shaft 57. In simplest form it might be a pointer 59 affixed to shaft 57 and arranged to move in front of a scale 54. The indicator is thus represented schematically in Figure 1. Shaft 57 is shown as extended beyond motor 63; this is to indicate that data provided by its angular position may if desired be fed mechanically to other apparatus.

Tubes 65 and 75 are a matched pair, having substantially identical characteristics, shown with their cathodes connected together and also connected through biasing resistor 66 to one side of the secondary winding of transformer 68. The other side of the secondary winding of this transformer is grounded. Condenser 67 is shunted across resistor 66 to by-pass A.-C. components of current. The grid of tube 75 is grounded. An A.-C. source 80 is connected across the primary winding of transformer 68. The A.-C. voltage developed across the secondary winding of transformer 68 is substantially less than the magnitude of D.-C. bias developed across resistor 66. One or two volts R. M. S. might be a typical value for this A.-C. voltage.

Transformer 71 has a center tapped primary winding 72 and a secondary winding 73. The plate of tube 65 is connected to one terminal of winding 72, and the plate of tube 75 is connected to the other. The center tap of winding 72 is connected to the positive side of D.-C. source 70, the negative side of source 70 being grounded. The terminals of secondary winding 73 are connected to the control voltage input terminals of a motor control system 81, shown in Figure 1 in block form. The voltage induced across winding 73 serves as control voltage for system 81.

The motor control system 81 supplies at its output a direct current which varies in magnitude proportionally to the magnitude of the A.-C. control voltage and whose direction depends upon whether the control voltage is identical or opposite in phase to a reference voltage. Such motor control systems are well known in the art; some of the simplest systems employ thyratron gas tubes in a phase-sensitive rectifier circuit. The output current from motor control system 81 is fed to the armature windings of D.-C. motor 64. D.-C. source 69 supplies a steady current for field excitation of motor 63. A.-C. source 80 is connected into motor control system 81, to supply the power consumed by the system and to provide a reference phase for the control voltage.

The operation of the system of Figure 1 may be best described by assuming at first that no voltages are being applied at terminals 50 and 60; that is, that voltages I and II are both zero. If that be the case, then regardless of the setting of movable contact 56 on the resistance element of potentiometer 55, the contact 56 will be at ground potential. Consequently, the grids of tubes 65 and 75 will be both at ground potential. Under these conditions tubes 65 and 75, because of their similar characteristics, will have equal A.-C. components of plate current. These currents pass through the respective halves of winding 72 in opposite directions, their magnetic effects cancel, and consequently the A.-C. voltage induced in secondary winding 73 is zero. The voltage across winding 73 is the control voltage for motor control system 81, and since the control voltage is zero, the output voltage is zero, the armature of motor 63 is not energized, and shaft 57 is stationary. This state of affairs might be called the quiescent state of the system.

Now, assume for purposes of illustration that contact 56 is resting at the midpoint of the resistance element of potentiometer 55, and further suppose that voltages I and II take finite values with voltage I being greater than voltage II. Under such circumstances, the potential at the contact 56 will be positive relative to ground, since the zero potential point on resistance element 53 will be at a point nearer the end connected to terminal 60. The positive voltage on contact 56 will be applied to the grid of tube 65 and cause the A.-C. transconductance of that tube to increase. In consequence the A.-C. component of plate current drawn by tube 65 becomes greater than that drawn by tube 75, a net A.-C. magnetic field results in transformer 71, and an A.-C. voltage is induced across winding 73. The motor control system 81 responds to this voltage to feed a direct current to the armature of motor 63, thereby causing it to rotate and correspondingly turning shaft 57. The connections to the armature of motor 63 should be such as to produce a direction of rotation appropriate in this illustration to move contact 56 toward the end of the resistance element connected to terminal 60. In other words, the rotation should always be in that direction which tends to reduce the magnitude of the control voltage induced across winding 73. (If motor 63 tends to turn in the wrong direction, the leads between the motor and the motor control system should be reversed.) When contact 56 has moved to the zero-potential point on the resistance element 53, the tubes 65 and 75 will again draw equal A.-C. plate currents, the voltage across winding 73 will drop to zero, and the motor will stop. The position of contact 56, and the corresponding angular position of shaft 57, will then correspond to a particular, and unique, ratio of voltage I to voltage II. Indicator 58 may readily be calibrated by applying voltages of known magnitudes to the input terminals 50 and 60. A small degree of unbalance in transformer 71 or slight differences in the characteristics of tubes 65 and 75 will affect only the calibration of the system, not its systematic accuracy, so by calibration on known voltages accurate indication of voltage ratios can be assured.

If, in the example given, the ratio of the two voltages be altered, the resulting unbalance will cause the motor to start again. If achievement of new balance requires that the contact 56 move toward the positive end of resistance element 53, the phase of the control voltage induced across winding 73 will be opposite to that which caused the action just described and in consequence the motor will rotate in the opposite direction and turn the shaft 57 until contact 56 rests on the new zero-potential point of resistance element 53.

In all cases the balance of the system, and its resulting indications, are independent of the magnitudes of the voltages being compared. Their ratio is the sole factor affecting the point of balance.

Some applications might call for more rapid response to ratio changes than the semi-mechanical embodiment of the invention just described could yield; also some uses might require data presentation in the form of an output voltage proportional to the ratio of the voltages being compared. To fulfill these requirements the wholly electronic embodiment of the invention shown in Figure 2 may be employed.

Referring to Figure 2, the D.-C. voltages to be compared are applied to the invention in the same manner as in the embodiment of Figure 1; that is, voltage I is applied between terminal 100 and ground, terminal 100 being positive relative to ground, and voltage II is applied between terminal 200 and ground, terminal 200 being negative relative to ground. Resistors 102 and 202 are of equal resistance; resistor 102 is connected between terminal 100 and ground and resistor 202 is connected between terminal 200 and ground. Condensers 101 and 201 have equal capacitance; condenser 101 is in shunt with resistor 102 and condenser 201 is in shunt with resistor 202.

Pentode tubes 110 and 210 are of the same type; identical characteristics in the two tubes are desirable. The plate of tube 110 is connected to terminal 100; the cathode of tube 210 is connected to terminal 200. The cathode of tube 110 and the plate of tube 210 are connected together. The suppressor grids of both tubes are tied to their respective cathodes. D.-C. screen supply 103 is connected between the screen grid and cathode of tube 110. D.-C. screen supply 203 is connected between screen grid and cathode of tube 210.

Tubes 150 and 250 are connected in a balanced modulator circuit similar to that comprising tubes 65 and 75 in the Figure 1 system. The cathodes of tubes 150 and 250 are connected together and are connected through biasing resistor 10 to one side of secondary winding 3 on transformer 1. The other side of winding 3 is grounded. Resistor 10 is shunted by by-pass condenser 11. The grid of tube 150 is connected to the cathode of tube 110; the grid of tube 250 is grounded. Output transformer 15 has a center-tapped primary winding 14 and a secondary winding 16. The plate of tube 150 is connected to one terminal of winding 14; the plate of tube 250 to the other. The center tap of winding 14 is connected to the positive side of D.-C. source 12. The negative side of source 12 is grounded.

A.-C. source 80 is applied to the primary winding 2 of transformer 1; as with the embodiment of Figure 1, the secondary winding 3 is proportioned to inject into the cathode circuits of tubes 150 and 250 a voltage substantially smaller than the D.-C. drop across biasing resistor 10. One or two volts R. M. S. might be normal for this voltage.

Secondary winding 16 of transformer 15 is connected to the input terminals of an amplifier 20, shown in Figure 2 in block form. The details of amplifier 20 are not critical so long as it is capable of amplifying signals of the frequency of source 80 without appreciable amplitude or phase distortion. Where the frequency of source 80 lies between 60 and 1000 cycles per second, as will normally be the case, any high-quality audio amplifier will serve very well. One output terminal of amplifier 20 is grounded; the other is connected to terminal 25 and through resistor 141 to the plate of diode 130 and through resistor 241 to the plate of diode 230.

The ungrounded output terminal of amplifier 20 is also connected to one side of moving coil 42 in dynamometer type indicator 40. The other side of coil 42 is grounded. A pointer 43, mechanically fixed to coil 42, and a scale 44 are shown schematically in Figure 2. Fixed coil 41 is connected across secondary winding 5 of transformer 1 and is thereby energized by an alternating current of constant phase and amplitude.

The cathode of diode 130 is connected through the primary winding of transformer 125 to ground. The cathode of diode 230 is connected through the primary winding of transformer 225 to ground. The cathodes of triode tubes 140 and 240 are grounded. The plate of tube 140 is connected to the plate of diode 130, and the plate of tube 240 is connected to the plate of diode 230. Secondary winding 4 on transformer 1 is center-tapped; the center tap is grounded. One terminal of winding 4 is connected to the grid of tube 140 through resistor 142; the other terminal of winding 4 is connected to the grid of tube 240 through resistor 242. The amplitude of the A.-C. voltage developed between either terminal of winding 4 and its center tap might be of the order of fifty to one hundred volts.

One side of the secondary winding of transformer 125 is connected to the cathode of diode 120; the other side is connected to the cathode of tube 110. Resistor 116 is connected between the plate of diode 120 and the cathode of tube 110. Condenser 115 is in parallel with resistor 116. The plate of diode 120 is connected through resistor 114 to the control grid of tube 110. Condenser 113 is connected between the control grid and cathode of tube 110.

One side of the secondary winding of transformer 225 is connected to the cathode of diode 220; the other side is connected to the cathode of tube 210. Resistor 216 is connected between the plate of diode 220 and the cathode of tube 210. Condenser 215 is in parallel with resistor 216. The plate of diode 220 is connected through resistor 214 to the control grid of tube 210. Condenser 213 is connected between the control grid and cathode of tube 210.

The operation of the Figure 2 embodiment of the invention may be described as follows: Suppose voltages I and II are applied at terminals 100 and 200; and further assume for illustrative purposes that voltage I is larger of the two. At first, since the grids of tubes 110 and 210 are at cathode potential, the tubes 110 and 210 will divide the voltage between terminals 100 and 200 equally with the result that the cathode of tube 110 will be positive relative to ground. The positive voltage, applied to the grid of tube 150, will cause the transconductance of that tube to exceed that of tube 250, and in consequence the A.-C. components of current in winding 14 will not cancel; instead an A.-C. magnetic field will be produced in transformer 15 which will induce an alternating voltage across secondary winding 16. This voltage is amplified by amplifier 20 and is applied to the plate circuits of tubes 130, 140, 230 and 240. The output voltage from amplifier 20 will be in phase with the grid voltage of one of the triodes 140 and 240 and opposite in phase to the grid voltage of the other. The connections of winding 16 to amplifier 20 should be such that the output voltage from amplifier 20, for this case, where voltage I is larger than voltage II, is opposite in phase to the grid voltage of tube 140.

If the phase relations are as specified, triode 140 will not conduct at any part of the cycle, since its grid will be below cut-off bias when its plate is positive. Consequently diode 130 will conduct on the positive half-cycles and pulses of current will flow through the primary of transformer 125. Triode 240, on the other hand, will conduct on the positive half-cycles of the voltage from amplifier 20, because its grid voltage and plate voltage will be in phase. As a result, therefore, the voltage at the plate of diode 230 will not rise appreciably above zero, and little or no current will flow in the circuit comprising diode 230 and the primary of transformer 225.

The pulses of current in the primary of transformer 125 induce an alternating voltage in its secondary winding, causing a rectified current to flow in diode 120 and through load resistor 116. The D.-C. voltage across resistor 116 is filtered by the R-C network comprising resistor 114 and condensers 113 and 115, and the resulting smooth D.-C. voltage is applied between control grid and cathode of tube 110, biasing that grid negatively and increasing the voltage drop across tube 110. This increased drop reduces the magnitude of the voltage at the cathode of tube 110 applied to the grid of tube 150. When a state of equilibrium is reached the potential at the cathode of tube 110 is practically zero—just sufficient to maintain the appropriate bias on the control grid of tube 110. Thus the two tubes, 110 and 210, divide the voltage between terminals 100 and 200 in almost exactly the same ratio as the ratio of the voltages themselves, since the cathode of tube 110 is at all times held almost exactly at ground potential.

If in the illustration just given, voltage I had been assumed smaller than voltage II, an entirely similar series of events would have been described except that the phase of the A.-C. voltage produced at the output of amplifier 20 would have been reversed, diode 230 would have conducted instead of diode 130 and a D.-C. bias would have been produced for tube 210 instead of tube 110.

The measure of the ratio of the voltages I and II, once the system has attained equilibrium, is the magnitude and phase of the A.-C. voltage at the output of amplifier 20, which is of course proportional to the amount of grid bias required to place the system in equilibrium. This A.-C. voltage is in this embodiment applied to indicator 40. Scale 44 may readily be calibrated in terms of voltage ratio. Zero voltage output from amplifier 20 indicates that voltages I and II are equal, corresponding to a ratio of unity. The moving coil and pointer might be spring-biased to show this ratio at the midpoint of scale 44. A ratio voltage I/voltage II which is greater than unity will produce a voltage from amplifier 20 having a given phase; this will cause coil 42 and pointer 43 to move in one direction. If the ratio of voltage I/voltage II is less than unity, the phase of the voltage from amplifier 20 will reverse and coil 42 and pointer 43 will move in the opposite direction. Obviously, calibration of the scale by applying known voltages is very simple to accomplish. The small unbalance required for production of the control voltage is proportional to the voltage ratio; hence it does not affect the system's accuracy, since it may be taken into account in calibration. As in the case of the embodiment of Figure 1, the governing factor controlling the indicator readings is the ratio of input voltages, not their magnitudes. If the control voltage from amplifier 20 be desired for employment in other apparatus, it may be taken off between terminal 25 and ground.

The process described whereby the system adjusts itself to equilibrium is completed within a very small fraction of a second; hence this embodiment is capable of registering continuous indication of a voltage ratio even when the voltages being compared are changing quite rapidly.

In Figure 3 there is shown schematically a simple circuit which can be used to adapt either of the embodiments just described to indicate the amplitude ratio of two A.-C. voltages. Transformers 310 and 320 in Figure 3 should be substantially identical, at least to the extent that their secondary-to-primary voltage ratios should be equal. A.-C. voltage I may be applied to the primary winding of transformer 310, and A.-C. voltage II may be applied to the primary winding of transformer 320.

One side of the secondary winding of transformer 310 is connected through condenser 311 to the cathode of diode 315. The other side of the secondary winding of transformer 310 is grounded. The plate of diode 315 is grounded. Resistor 316 is connected between cathode and plate of tube 315. A filter comprising resistor 312 and condenser 313 in series is connected between the cathode of diode 315 and ground, and the output lead, to go to terminal 50 in the embodiment of Figure 1 or terminal 100 in the embodiment of Figure 2, is taken from the junction of resistor 312 and condenser 313.

One side of the secondary winding of transformer 320 is connected through condenser 321 to the cathode of diode 325. The other side of the secondary winding of transformer 320 is connected to the plate of diode 325. The cathode of diode 325 is grounded. Resistor 326 is connected between the plate of diode 325 and ground. A filter comprising resistor 322 and condenser 323 in series is connected between the plate of diode 325 and ground. From the junction of resistor 322 and condenser 323 is taken the output lead to be connected to terminal 60 on the embodiment of Figure 1 or to terminal 200 on the embodiment of Figure 2.

The operation of the Figure 3 circuit is simply that of a pair of shunt-connected diode rectifiers, connected together in such manner as to provide a pair of D.-C. voltages polarized in appropriate manner, one of which is proportional to the amplitude of A.-C. voltage I and the other of which is similarly proportional to A.-C. voltage II. Thus by connecting the circuit between the A.-C. voltage sources and the input terminals, it is possible to make either embodiment of the invention indicate the ratio of amplitudes of two independent A.-C. voltages.

It will be understood that the various embodiments of the invention herein shown and described are exemplary only, and that the scope of the invention is to be determined by reference to appended claims.

The invention described herein may be manufactured and used by or for the Government of the United States of America for governmental purposes without the payment of any royalties thereon or therefor.

What is claimed is:

1. In combination, a pair of voltage sources connected in series and having a terminal in common, a pair of impedance elements of which at least one is variable, connected in series and having a terminal in common; means connecting the voltage sources and the impedance elements in series to form a closed circuit; and means for sensing the potential difference between a point intermediate said voltage sources and a point intermediate said impedance elements, and means responsive to the potential difference between the points intermediate the voltage sources and the impedance elements to vary one of the impedance elements to make the ratio of the impedance elements substantially equal to the ratio of the voltages.

2. In combination, a pair of voltage sources connected in series and having a terminal in common, a pair of impedance elements of which at least one is variable, connected in series and having a terminal in common; means connecting the voltage sources and the impedance elements in series to form a closed circuit, means for sensing the potential difference between a point intermediate said voltage sources and a point intermediate said impedance elements, and means responsive to the potential difference between the points intermediate the voltage sources and the impedance elements to vary one of the impedance elements to reduce said potential difference to zero, whereupon the ratio of the impedance elements is substantially equal to the ratio of the voltages, and indicator means operative to indicate the ratio of the impedances.

3. In combination, a pair of voltage sources connected in series and having a terminal in common; a pair of impedance elements, of which at least one is variable, connected in series and having a terminal in common; means connecting the open terminals of the voltage sources respectively to the open terminals of the impedance elements, means for sensing the potential difference between said common terminals; and means responsive to the potential difference between the said common terminals operative to vary one of the impedance elements to make the ratio of the impedance elements substantially equal to the ratio of the voltages.

4. In combination, a pair of voltage sources connected in series and having a terminal in common; a pair of impedance elements of which at least one is variable, connected in series and having a common terminal; means connecting the open terminals of the voltage sources respectively to the open terminals of the impedance elements, means for sensing the potential difference between said common terminals; means responsive to the potential difference between the said common terminals operative to vary one of the impedance elements to make the ratio of the impedance elements substantially equal to the ratio of the voltages; and indicator means operative to indicate the ratio of the impedance elements.

5. In combination, a pair of voltage sources connected in series and having a terminal in common; a pair of variable impedance elements connected in series and having a terminal in common; means connecting the open terminals of the voltage sources respectively to the open terminals of the impedance elements, means for sensing the potential difference between said common terminals; and means responsive to the potential difference between the said common terminals operative to vary the impedance elements to reduce said potential difference to zero, whereupon the ratio of the impedance elements is substantially equal to the ratio of the voltages.

6. In combination, a pair of voltage sources connected in series and having a terminal in common; a pair of variable impedance elements connected in series and having a terminal in common; means connecting the open terminals of the voltage sources respectively to the open terminals of the impedance elements, means for sensing the potential difference between said common terminals; means responsive to the potential difference between the said common terminals operative to vary the impedance elements to make their ratio substantially equal to the ratio of the voltages; and indicator means operative to indicate the ratio of the impedance elements.

7. In combination, a pair of voltage sources connected in series and having a terminal in common; a fixed impedance means and a movable contact resting thereon to define a boundary between elements of said impedance means on opposite sides of said contact; means connecting the extremities of the impedance means respectively to the open terminals of the voltage sources; and means responsive to the potential difference between the movable contact and said common terminal operative to move the movable contact to the point on the impedance means where said potential difference is zero, whereupon the ratio of the impedances of the elements of said impedance means on opposite sides of said contact provides a measure of the ratio of said voltage sources.

8. In combination, a pair of voltage sources connected in series and having a terminal in common; a fixed impedance means and a movable contact resting thereon to define a boundary between elements of said impedance means on opposite sides of said contact; means connecting the extremities of the impedance means respectively to the open terminals of the voltage sources; means responsive to the potential difference between the movable contact and said common terminal operative to move the movable contact to the point on the impedance means where said potential difference is zero; whereupon the ratio of the impedances of the elements of said impedance means on opposite sides of said contact provides a measure of the ratio of said voltage sources; and indicator means operative to indicate by the location of said zero-potential point the ratio of the voltages.

9. In combination, a pair of voltage sources connected in series and having a terminal in common; a fixed impedance means and a movable contact resting thereon; means connecting the extremities of the impedance means respectively to the open terminals of the voltage sources; motor means mechanically coupled to the movable contact; and motor control means responsive to the potential difference between the movable contact and said common terminal operative to cause said motor means to move the movable contact to the point on the impedance means where said potential difference is zero, whereupon the ratio of the impedances of the elements of said impedance means on opposite sides of said contact provides a measure of the ratio of said voltage sources.

10. In combination, a pair of voltage sources connected in series; a pair of vacuum tubes connected in series between the open terminals of the voltage sources; and means responsive to the difference of the potential drops across the vacuum tubes operative to adjust the ratio of their effective impedances substantially to equal the ratio of the voltages.

11. In combination, a pair of voltage sources connected in series; a pair of vacuum tubes connected in series between the open terminals of the voltage sources; and means responsive to the difference of the potential drops across the vacuum tubes operative to adjust the ratio of their effective impedances substantially to equal the ratio of the voltages and to provide an output voltage substantially proportional to the ratio of the voltages.

12. In combination, a pair of voltage sources connected in series and having a pair of open voltage source terminals and a terminal in common; first and second vacuum tubes, each having a cathode, a plate, and a grid; means connecting the plate of the first tube to one open voltage source terminal; means connecting the cathode of the second tube to the other open voltage source terminal; means connecting the cathode of the first tube to the plate of the second tube; and control means responsive to the potential difference between said common terminal and the cathode of the first tube operative to adjust the grid bias on the tubes to render the ratio of their effective impedances substantially equal to the ratio of the voltages and operative to provide an output voltage substantially proportional to the ratio of the voltages.

13. In combination, a pair of D.-C. voltage sources connected in series and having a pair of open voltage source terminals and a common terminal; first and second vacuum tubes, each having a cathode, a plate and a grid; means connecting the plate of the first tube to the positive open voltage source terminal; means connecting the cathode of the second tube to the negative open voltage source terminal; means connecting the cathode of the first tube to the plate of the second tube; modulator means operative to produce an A.-C. output voltage proportional in amplitude to the magnitude of the potential difference between the cathode of the first tube and said common terminal and governed in phase by the polarity of said potential difference; amplifier means operative to amplify the output voltage of the modulator means; phase-sensitive rectifier means operative to rectify the modulator output voltage as amplified and to impress the resulting D.-C. voltage as a grid bias on the first or second tube as determined by the phase of said modulator output voltage, said grid bias being operative to make the ratio of the tube impedances substantially equal to the voltage ratio; and output means fed by the modulator output voltage as amplified.

References Cited in the file of this patent
UNITED STATES PATENTS

| | | |
|---|---|---|
| 1,428,156 | Espenschied | Sept. 5, 1922 |
| 1,727,388 | Affel | Sept. 10, 1929 |
| 2,129,880 | Scherbatskoy | Sept. 13, 1938 |
| 2,200,863 | Schuck | May 14, 1940 |
| 2,202,885 | Zuschlag | June 4, 1940 |
| 2,293,403 | Razek | Aug. 18, 1942 |
| 2,348,177 | Keeler | May 2, 1944 |
| 2,369,138 | Cook | Feb. 13, 1945 |
| 2,399,695 | Satterlee | May 7, 1946 |